United States Patent [19]
Nagao et al.

[11] Patent Number: 4,552,112
[45] Date of Patent: Nov. 12, 1985

[54] VALVE TIMING CONTROL FOR INTERNAL COMBUSTION ENGINES

[75] Inventors: Akihito Nagao; Kouichi Takahashi; Shunji Masuda; Misao Fujimoto; Toshio Nishikawa, all of Hiroshima, Japan

[73] Assignee: Mazda Motor Corporation, Hiroshima, Japan

[21] Appl. No.: 634,349

[22] Filed: Jul. 25, 1984

[30] Foreign Application Priority Data

Jul. 25, 1983 [JP] Japan .................. 58-136260

[51] Int. Cl.$^4$ .................. F01L 1/34; F02B 31/02
[52] U.S. Cl. .................. 123/432; 123/90.17; 123/308
[58] Field of Search .............. 123/90.15, 90.16, 90.17, 123/90.27, 308, 432

[56] References Cited

U.S. PATENT DOCUMENTS

| | | | |
|---|---|---|---|
| 2,260,983 | 10/1941 | Walker | 123/90.16 |
| 3,422,803 | 1/1969 | Stivender | 123/90.16 |
| 4,285,310 | 8/1981 | Takizawa et al. | 123/90.16 |
| 4,347,812 | 9/1982 | Kosuda et al. | 123/90.16 X |
| 4,442,806 | 4/1984 | Matsuura et al. | 123/90.27 |
| 4,480,617 | 11/1984 | Nakano et al. | 123/308 |

FOREIGN PATENT DOCUMENTS

| | | |
|---|---|---|
| 2901186 | 7/1980 | Fed. Rep. of Germany . |
| 1245669 | 10/1960 | France . |
| 52-35816 | 5/1976 | Japan . |
| 52-35819 | 6/1976 | Japan . |
| 1303080 | 1/1973 | United Kingdom . |

Primary Examiner—Ira S. Lazarus
Attorney, Agent, or Firm—Fleit, Jacobson, Cohn & Price

[57] ABSTRACT

An engine intake system includes a combustion chamber, a first intake port opening to the combustion chamber, and a second intake port opening to the combustion chamber. A shut-off valve is provided for blocking intake gas flow to the combustion chamber through the second intake port in a first engine operating region wherein engine load is relatively small, and allowing the intake gas to flow to the combustion chamber through the second intake port in a second engine operating region wherein the engine load is relatively large. A first valve actuating mechanism is provided for opening the first intake valve at a first timing, and a second valve actuating mechanism is provided for opening the second intake valve at a second timing. A valve timing changing device is provided for changing the first timing with respect to the second timing so that the first intake valve is closed later than the second intake valve in the second engine operating region, and so that the first intake valve is closed at least in a certain engine operating zone in the first engine operating region at a timing which is more advanced than the timing at which the first intake valve is closed in the second engine operating region.

6 Claims, 7 Drawing Figures

F I G. 2
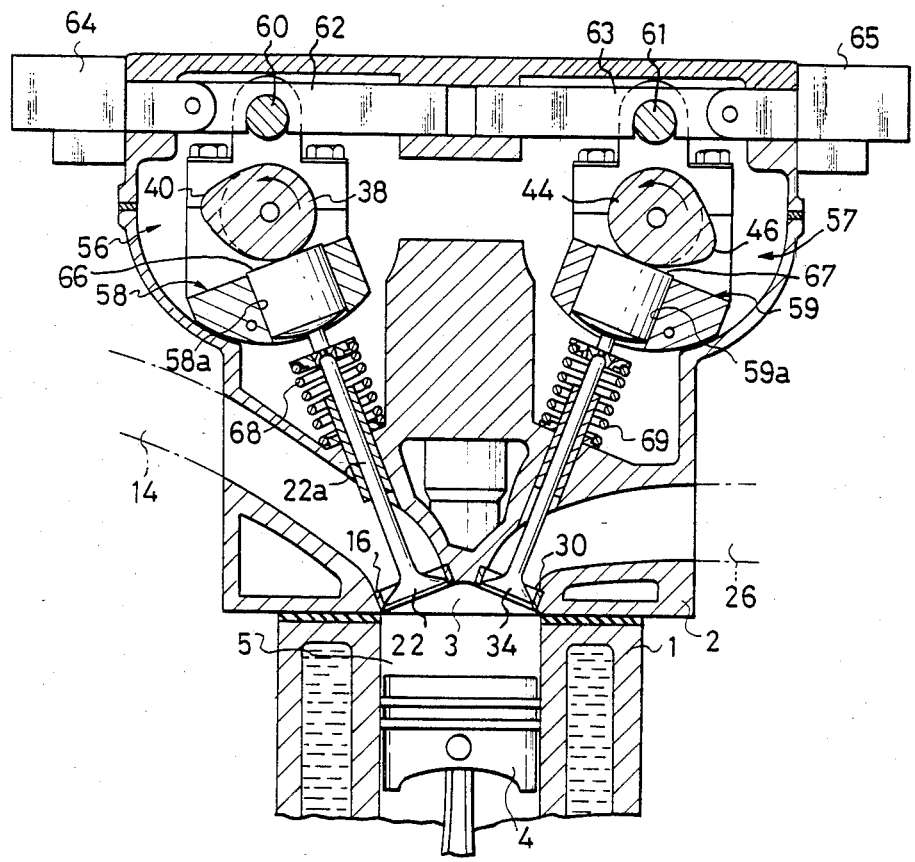

VALVE TIMING CONTROL FOR INTERNAL COMBUSTION ENGINES

The present invention relates to a valve timing control for internal combustion engines and more particularly to a timing control for intake valves of internal combustion engines.

In general, it has been known in the field of internal combustion engines that timings of intake and exhaust valves have influences on engine operation so that it is desirable that the valve timings be changed in accordance with the engine operating conditions. For example, under a heavy load operation, it is desirable to increase the intake valve opening period so that the intake charge be increased to thereby obtain an increase in the engine output. For purpose, the intake valve closing timing may be retarded, however, the solution will be accompanied by a disadvantage in that a blow back of intake gas will be produced under a heavy load, low speed operation. As an alternative measure, the intake valve opening timing may be advanced to increase the intake valve opening period, but this will result in an increase in the overlap period between the exhaust and intake valves. As well known in the art, the overlap period has an important influence on the amount of residual combustion gas which will be entrained in the intake mixture, and it is desirable to make the overlap period as small as possible under a light load engine operation so that the quantity of residual combustion gas be minimized to thereby obtain a stable engine operation. By thus decreasing the overlap period, it becomes possible to decrease the idling speed with the result of improvement in fuel economy. Further, it becomes possible to decrease pollutant emissions in the exhaust gas.

In view of the above circumstances, it has already been proposed to change the valve timings in accordance with the engine operating conditions. For example, Japanese patent publication No. 52-35819 discloses a valve timing control mechanism which includes a timing belt for transmitting the rotation of the engine crankshaft to pulleys for driving valve operating cam shafts. In the mechanism disclosed by the Japanese patent publication, the pulleys are connected respectively with the cam shafts through centrifugal phase shifting gear mechanisms so that the phases of the cam shafts are changed with respect those of the pulleys to thereby change the valve timings.

As another example of known valve timing changing mechanisms, there is disclosed by the Japanese patent publication No. 52-35816 a cam shaft driving system which includes a timing belt connecting cam shaft driving pulleys with the engine crankshaft, the timing belt being provided with a belt tensioning mechanism which has a device for changing the rotational phases of the cam shafts with respect to that of the crankshaft so that the valve timings can be changed as desired.

The aforementioned known mechanisms are to change the valve timings in accordance with the engine operating conditions. It should be noted however that the mechanisms are not satisfactory because they cannot change the valve opening periods so that they cannot perform the valve timing control to a satisfactory degree in accordance with the engine operating conditions.

It is therefore an object of the present invention is to provide a valve timing control mechanism which can change the valve opening period.

Another object of the present invention is to provide an engine intake valve mechanism in which the overall valve opening period can be changed in accordance with the engine operating condition so that the intake charge can be adequately increased for heavy load operations, without having any adverse effects on the combustion of the mixture throughout the engine operating range including low speed and high speed regions.

A further object of the present invention is to provide an engine intake system having at least two intake ports for one combustion chamber with intake valves respectively for the intake ports, at least one of the intake valves having a variable timing mechanism so that the overall valve opening period can be changed in accordance with the engine operating condition.

According to the present invention, the above and other objects can be accomplished by an engine intake system including combustion chamber means, first intake port means opening to said combustion chamber means, second intake port means opening to said combustion chamber means, first intake valve means associated with said first intake port means, second intake valve means associated with said second intake port means, first valve actuating means for opening said first intake valve means at a first timing, second valve actuating means for opening said second intake valve means at a second timing, timing changing means for changing at least said first timing so that an overall valve opening period defined by said first and second timings be changed.

In a preferable aspect of the present invention, the engine intake system is provided with means for preventing intake gas from passing through said second intake port means at least under a low speed, light load engine operation. The preventing means may be comprised of shut-off valve means provided for intake passage means leading to the second intake port means. Alternatively, the preventing means may be means for making the second valve actuating means inactive so that the second intake valve means is maintained closed under low speed, light load operation.

According to a further aspect of the present invention, the timing changing means is responsive to engine operating conditions so that the first timing is changed in accordance with the engine operating condition. As an example, the first timing is changed so that at least closing timing of the first intake valve mans is retarded under high speed, heavy load operation so that the first intake valve means is closed later than the second intake valve means. It is preferable in an engine operating range wherein the intake gas is introduced only through the first intake port means to retard the opening timing of the first intake valve means in an engine idling operation, and advance the opening timing when the engine load is increased. Thus, where the timing changing means is of such a type that changes the opening and closing timings simultaneously without changing the valve opening period, it is preferable that the timing of the first intake valve means is at the most retarded position during high speed, heavy load operation, at the most advanced position under a medium load operation and at a position between the aforementioned two positions during idling operation.

The above and other objects and features of the present invention will become apparent from the following descriptions of a preferred embodiment taking reference to the accompanying drawings, in which;

FIG. 2 is a vertical sectional view of the engine shown in FIG. 1;

Figure 1:
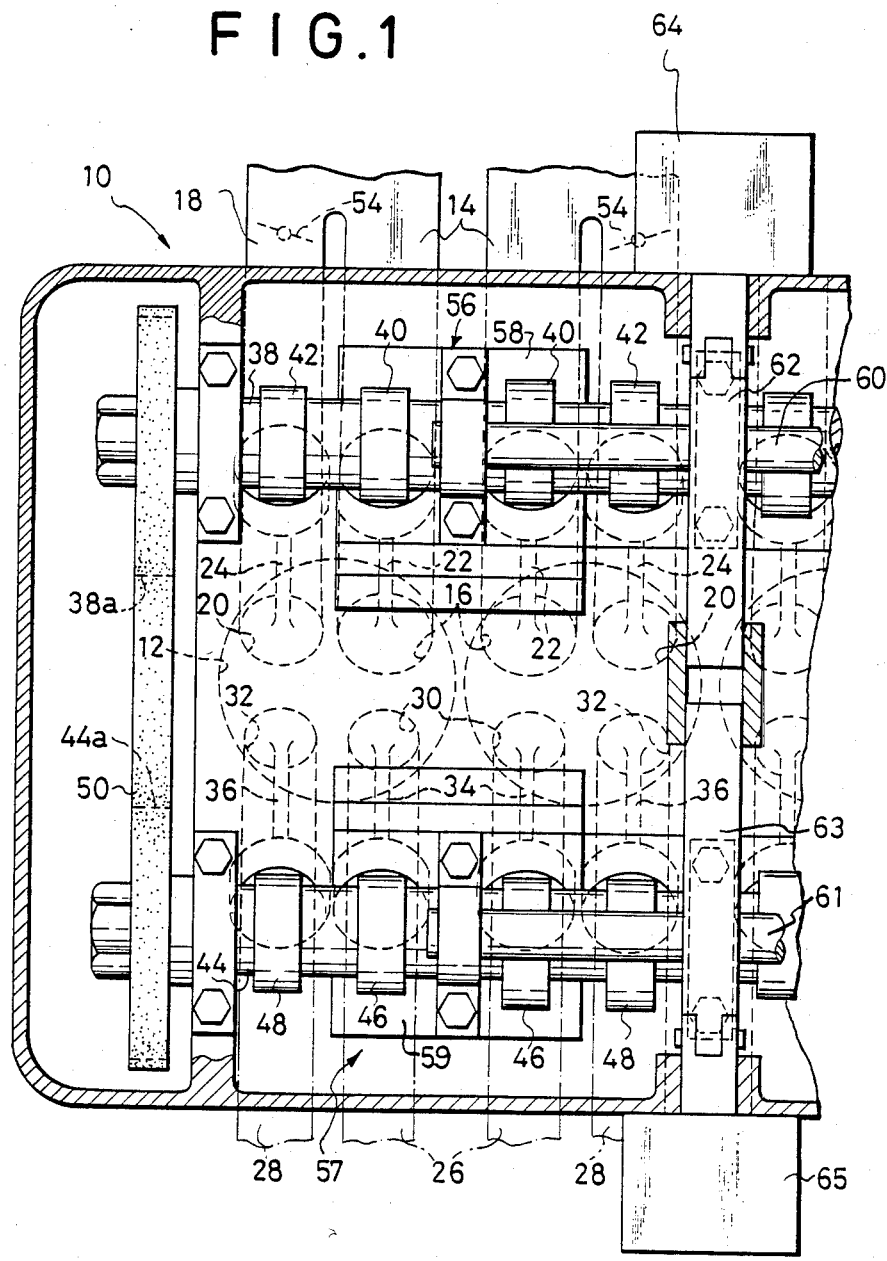
FIG. 1 is a fragmentary sectional view of a cylinder head portion of the engine embodying the features of the present invention.

Referring to the drawings, particularly to FIGS. 1 and 2, there is shown an engine 10 including a cylinder block 1 formed with a plurality of cylinder bores 12 which are arranged in series. A cylinder head 2 is mounted on the upper end portion of the cylinder block 1 and formed with recesses 3 at portions corresponding to the cylinder bores 12. A piston 4 is disposed in each of the cylinder bores 12 for reciprocating movements. A combustion chamber 5 is defined in the cylinder bore 12 by the cylinder head 2 and the piston 4.

The cylinder head 2 is formed with a primary intake port 16 and a secondary intake port 20 which are opening to each of the combustion chambers 5 in the respective cylinder bores 12. The primary intake port 16 is connected with a primary intake passage 14 and the secondary intake port 20 is connected with a secondary intake passage 18. In the primary intake port 16, there is provided a primary intake valve 22. Similarly, the secondary intake port 20 is associated with a secondary intake valve 24.

The cylinder head 2 is also formed with a pair of exhaust ports 30 and 32 opening to each of the combustion chambers 5 in the respective cylinder bores 12. The exhaust ports 30 and 32 are respectively associated with a first exhaust valve 34 and a second exhaust valve 36. The exhaust ports 30 and 32 are respectively connected with exhaust passages 26 and 28.

For operating the intake valves 22 and 24, there is provided a camshaft 38 having cams 40 and 42. Similarly, there is provided a camshaft 44 having cams 46 and 48 for operating the exhaust valves 34 and 36. The camshafts 38 and 44 are respectively provided with pulleys 38a and 44a which are engaged with a timing belt 50 to be driven by an engine crankshaft (not shown).

Although not shown in the drawings, the primary intake passages 14 and the secondary intake passages 18 are connected with an intake manifold which leads from a main intake passage provided with a throttle valve. Each of the secondary intake passages 18 is provided with a shut-off valve 54 which is controlled in accordance with the engine load and the engine speed so that it is opened under high speed, heavy load engine operation.

The secondary intake valves 24 are actuated by the cams 42 on the camshaft 38 in a conventional manner, whereas the primary intake valves 22 are actuated through timing changing mechanisms 56.

FIG. 2 shows details of the timing changing mechanism 56. As shown, the mechanism 56 includes a swingable block 58 carried by the camshaft 38 for swinging movements about the camshaft 38. The swingable block 58 includes a pair of bores 58a for slidably receiving tappets 66, although only one of the bores 58a is shown in FIG. 2. As shown in FIG. 1, the primary intake valves 22 for two adjacent combustion chambers are located adjacent to each other so that the tappets 66 carried by the swingable block 58 are associated with the respective primary intake valves 22. Thus, the combustion chambers 5 are divided into a plurality of groups, each comprising a pair of adjacent combustion chambers 5, and the swingable block 58 is provided for each pair of the combustion chambers 5.

As shown in FIG. 2, the primary intake valve 22 has a valve stem 22a and a valve spring 68 is provided to act on the valve stem 22a to thereby force the valve 22 toward a closed position. The tappet 66 is engaged at the upper end with the cam 40 on the camshaft 38 and at the lower end with the valve stem 22a so that the valve 22 is opened by the cam 40 against the action of the valve spring 66. In this mechanism, as the swingable position of the block 58 is changed, the relative position between the cam 40 and the tappet 66 is correspondingly changed so that the valve timing is also changed.

In order to determine the position of the swingable block 58, there is provided a driving rod 60. As shown in FIG. 1, the driving rod 60 is provided above and extends in parallel with the camshaft 38, and connected with the swingable blocks 58 at their upper ends. An actuating rod 62 extends perpendicularly to the driving rod 60 and is engaged therewith so that an axial movement of the actuating rod 62 produces a lateral movement of the driving rod 62 causing swingable movements of the blocks 58. The driving rod 62 is connected at one end with a driving motor 64 to be driven thereby.

In the illustrated embodiment, there are provided timing changing mechanisms 57 for changing the timings of the first exhaust valves 34 which are located opposite to the primary intake valves 22. The mechanism 57 is similar in arrangement and function to the timing changing mechanism 56, and includes a swingable block 59, a driving rod 61, an actuating rod 63, a driving motor 65, a tappet 67 and a valve spring 69.

Figure 3:
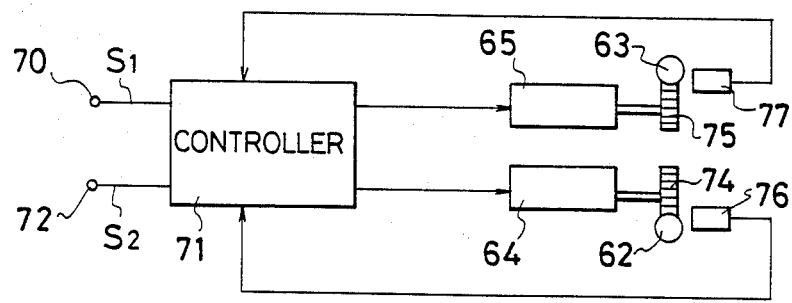
FIG. 3 is a diagrammatical view showing the valve timing control system.

In order to control the operations of the motors 64 and 65, there is provided as shown in FIG. 3 a control circuit 71, which may preferably be comprised of a microprocessor. The control circuit 71 is connected with an engine speed sensor 70 and an engine load sensor 71 to receive an engine speed signal $S_1$ and an engine load signal $S_2$ therefrom. The control circuit 72 produces control signals in accordance with the engine speed signal $S_1$ and the engine load signal $S_2$. The control signals are applied to the motors 64 and 65, which are of the reversible type and drive gears 74 and 75, respectively, to thereby drive the actuating rods 62 and 63, respectively. The positions of the actuating rods 62 and 63 are detected by position sensors 76 and 77 and outputs of the position sensors 76 and 77 are applied to the control circuit 71 as valve timing signals.

Figure 4:
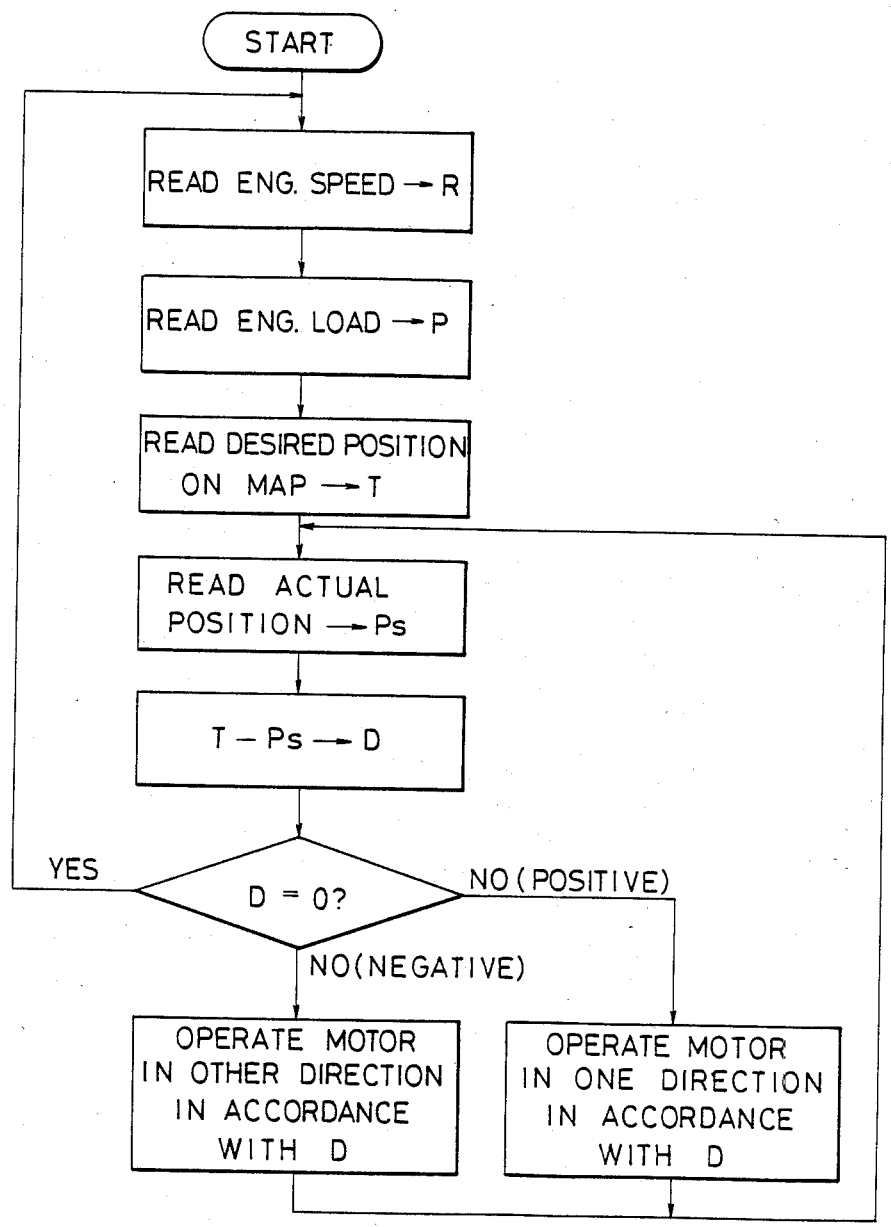
FIG. 4 is a flow chart showing the operation of the control circuit.

Referring now to FIG. 4, there is shown a flow chart of the operation of the control circuit 71. In the operation, the engine speed R is at first read from the speed signal $S_1$ and the engine load P is read from the load signal $S_2$. The control circuit 71 includes a random access memory RAM which has a map of desired positions T of the actuating rods 62 and 63 as determined in accordance with various combinations of engine speed R and engine load P. For controlling the timing of the primary intake valve 22, the control circuit 71 reads the desired position T of the actuating rods 62 corresponding to the actual engine speed R and the engine load P. Thereafter, the actual position Ps of the rod 62 is obtained from the position signals produced by the position sensor 76. The actual position Ps is then compared with the desired position T to obtain a deviation D. Where the deviation D is zero, the motor 64 is not operated so that the actuating rod 62 is maintained at its existing position. Where the deviation D is of a positive value, the motor 64 is energized to move the rod 62 in one direction. Where the deviation D is of a negative value, the motor 64 is operated in the opposite direction. The control of the first exhaust valve 34 is carried out in a similar manner.

Figure 5:
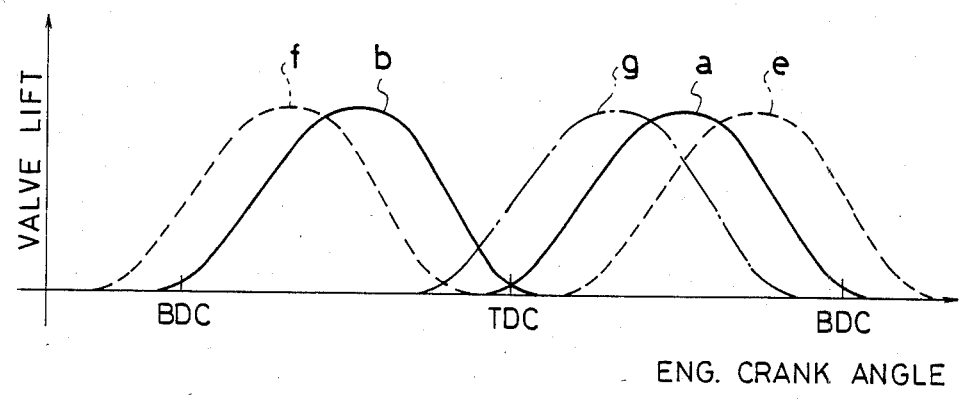
FIG. 5 is a diagram showing the timing of the primary intake valve.
Figure 6:
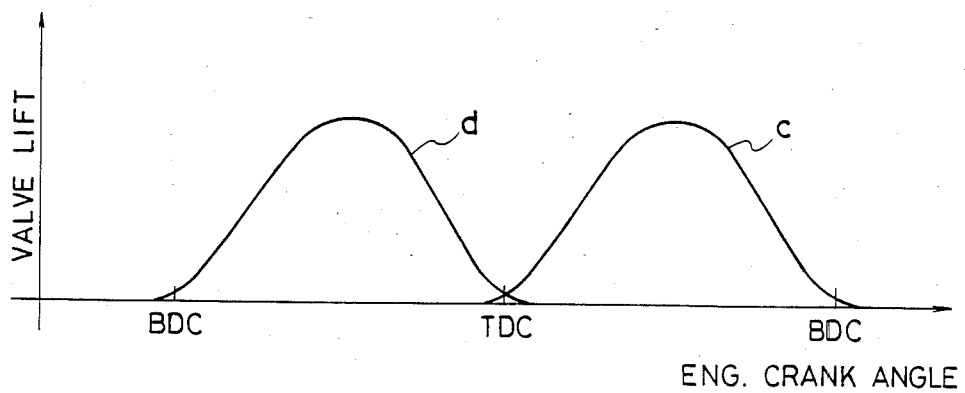
FIG. 6 is a diagram showing the timing of the secondary intake valve.

FIGS. 5 and 6 show an example of the valve timing control in accordance with the present invention. Under low speed, light load engine operation, the shut-off valve 54 is closed so that the intake mixture is supplied to the combustion chamber 5 only through the primary intake port 16. At this instance, the primary intake valve 22 has a timing as shown by a curve a in FIG. 5. The first exhaust valve 34 has a timing as shown by a curve b in FIG. 5. The secondary intake valve 24 has a fixed timing as shown by a curve c in FIG. 6 which is the same as the timing a of the primary intake valve 22. The second exhaust valve 36 has a fixed timing as shown by a curve d in FIG. 6 which is the same as the timing b of the first exhaust valve 34. As shown in FIGS. 5 and 6, under the timings, the overlap period between the exhaust and intake valves is relatively small so that it is possible to decrease the amount of the residual combustion gas, thereby providing stable combustion under a tight load. This feature is particularly desirable for idling operations. The valve timing a is effective to prevent blow back of the intake mixture since the intake valve is closed as soon as the compression stroke starts. Therefore, the valve timing a is also preferable for low speed, heavy load operation.

Under high speed, heavy load operation, the shut-off valve 54 is opened and the timing of the primary intake valve 22 is retarded as shown by curve e in FIG. 5. With this timing control, the overall intake valve opening period is increased since the intake stroke starts when the secondary intake valve 24 opens and ends when the primary intake valve 22 closes. Thus, it becomes possible to increase intake charge utilizing the inertia of the intake gas. At this instance, the timing of the first exhaust valve 34 may be advanced as shown by curve f in FIG. 5. This advancement of the exhaust valve timing is effective to enhance exhausting of combustion gas, resulting in an increase in the engine output.

During medium load operation, wherein the shut-off valve 54 is closed but the engine is loaded for city area driving, the timing of the primary intake valve 22 is advanced as shown by curve g in FIG. 5. By this control, the overlap period between the exhaust and intake valves is increased resulting in an increase in the residual combustion gas. Such an increased amount of residual combustion gas produces an effect similar to that of exhaust gas recirculation so that it becomes possible to suppress production of nitrogen oxides.

Figure 7:
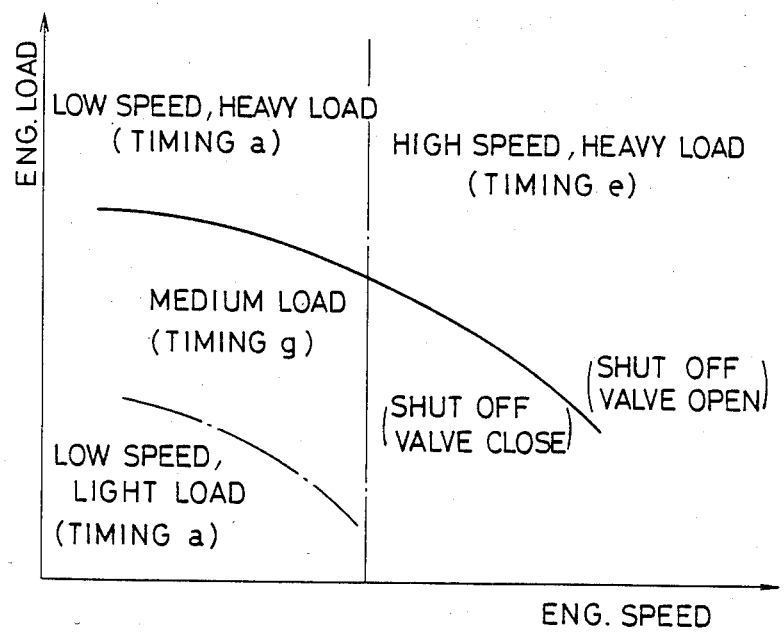
FIG. 7 is a diagram showing the primary intake valve timing control.

Under an operating range wherein the engine load is relatively low, the intake mixture is introduced only through the primary intake port 16. Therefore, the timing control of the primary intake valve 22 is very efficient. Further, as described, through the timing control of the primary intake valve 22, it becomes possible to increase the overall intake valve opening timing. The aforementioned timing control of the primary intake valve 22 is shown in FIG. 7 in relation to the operation of the shut-off valve 54.

The invention has thus been shown and described with reference to a specific embodiment, however, it should be noted that the invention is in no way limited to the details of the illustrated arrangements but changes and modifications may be made without departing from the scope of the appended claims.

We claim:

1. An engine intake system including combustion chamber means, first intake port means opening to said combustion chamber means, second intake port means opening to said combustion chamber means, first intake valve means associated with said first intake port means, second intake valve means associated with said second intake port means, first valve actuating means for providing an opening period of said first intake valve means in each engine operating cycle at a first timing, second valve actuating means for providing an opening period of said intake valve means in each engine operating cycle at a second timing, means for preventing intake gas from passing through said second intake port means at least during low speed, light load engine operation, and timing changing means for changing at least said first timing so that an overall valve opening period defined by said first and second timings is changed in accordance with engine operating conditions.

2. An engine intake system in accordance with claim 1 in which said preventing means is comprised of shut-off valve means provided in intake passage means leading to the second intake port means.

3. An engine intake system including combustion chamber means, first intake port means opening to said combustion chamber means, second intake port means opening to said combustion chamber means, intake control means for blocking intake gas flow to said combustion chamber means through said second intake port means in a first engine operating region wherein engine load is relatively small and for allowing the intake gas to flow to said combustion chamber means through said second intake port means in a second engine operating region wherein the engine load is relatively large, first valve actuating means for providing an opening period of said first intake valve means in each engine operating cycle at a first timing, second valve actuating means for providing an opening period of said second intake valve means in each engine operating cycle at a second timing, timing changing means for changing said first timing with respect to said second timing to close said first intake valve means later than said second intake valve means during operation in said second engine operating region and to close said first intake valve means at least in a specific engine operating zone during operation in said first engine operating region at a timing which is more advanced than the timing at which said first intake valve means is closed during operation in the second engine operating region.

4. An engine intake system in accordance with claim 3 in which said timing changing means includes means for changing said first timing at least in two different positions in said first engine operating region.

5. An engine intake system in accordance with claim 4 in which said timing changing means includes means for changing said first timing in said first engine operating region so that said first intake valve means is opened under a larger load condition at a timing advanced than under a smaller load condition.

6. An engine intake system including combustion chamber means, first intake port means opening to said combustion chamber means, second intake port means opening to said combustion chamber means, intake control means for blocking intake gas flow to said combustion chamber means through said second intake port means under a first engine operating region wherein engine load is relatively small and allowing the intake gas to flow to said combustion chamber means through said second intake port means in a second engine operating region wherein the engine load is relatively large, first valve actuating means for providing an opening period of said fist intake valve means in each engine operating cycle at a first timing, second valve actuating means for providing an opening period of said intake valve means in each engine operating cycle at a second timing, timing changing means for changing said first timing with respect to said second timing to a retarded position wherein said first intake valve means is closed later than said second intake valve means in said second engine operating region, to an advanced position wherein the first intake port means is opened earlier than said second intake valve means in a medium load zone in said first engine operating region and to an intermediate position between said advanced and retarded positions in at least one of a low speed, heavy load zone in said second engine operating region and a light load zone in said first engine operating region.

* * * * *